United States Patent
Serrat Jurado

(10) Patent No.: US 12,486,167 B2
(45) Date of Patent: Dec. 2, 2025

(54) METHOD AND APPARATUS FOR SELECTIVELY CANCELLING THE EFFECT OF THE ACTIVE CENTER OF A MOLECULE

(71) Applicant: UNIVERSITAT POLITECNICA DE CATALUNYA, Barcelona (ES)

(72) Inventor: Carles Serrat Jurado, Sant Julià de Vilatorta (ES)

( * ) Notice: Subject to any disclaimer, the term of this patent is extended or adjusted under 35 U.S.C. 154(b) by 176 days.

(21) Appl. No.: 18/579,461

(22) PCT Filed: Jul. 8, 2022

(86) PCT No.: PCT/EP2022/069078
§ 371 (c)(1),
(2) Date: Jan. 15, 2024

(87) PCT Pub. No.: WO2023/285306
PCT Pub. Date: Jan. 19, 2023

(65) Prior Publication Data
US 2025/0002339 A1    Jan. 2, 2025

(30) Foreign Application Priority Data
Jul. 16, 2021    (EP) .................................... 21382647

(51) Int. Cl.
*H01S 4/00*    (2006.01)
*C01B 5/00*    (2006.01)

(52) U.S. Cl.
CPC . *C01B 5/00* (2013.01); *H01S 4/00* (2013.01)

(58) Field of Classification Search
None
See application file for complete search history.

(56) References Cited

U.S. PATENT DOCUMENTS

| | | | |
|---|---|---|---|
| 2013/0148203 A1* | 6/2013 | Debus | G02B 27/00 359/615 |
| 2017/0362585 A1* | 12/2017 | Wang | G06T 11/006 |
| 2019/0129278 A1* | 5/2019 | Ichihara | G01N 21/6458 |

OTHER PUBLICATIONS

Schoenlein, R. W.; Chattopadhyay, S.; W. Chong, H. H.; Glover, T. E.; Heimann, P.A.; Shank, C. V.; Zholents, A. A.; Zolotorev, M. S. Generation of femtosecond pulses of synchrotron radiation. Science 2000, 287, 223.

Feng, C.; Deng, H. Review of fully coherent free-electron lasers. Nucl. Sci. Tech. 2018, 29, 160.

(Continued)

Primary Examiner — Hoon K Song
(74) *Attorney, Agent, or Firm* — Eugenio J. Torres-Oyola; Victor M. Rodriguez-Reyes; Rafael Rodriguez-Muriel

(57) ABSTRACT

A method and an apparatus for selectively cancelling the effect of the active center of a molecule are provided. The method comprises illuminating a target molecule with two synchronized ultrashort X-ray pulses using a laser, the two synchronized ultrashort X-ray pulses having different central photon energies the subtraction of which matches the photon energy of a peak of the core spectrum of the target molecule, such that a core state of an atom of the target molecule, and also of identical surrounding molecules, is selectively excited by the re-DFG effect as a result of the illumination. The method is implementable for simple or complex molecular systems and bulk materials.

16 Claims, 4 Drawing Sheets

(56) References Cited

OTHER PUBLICATIONS

Rossbach, J; Schneider, J. R.; Wurth, W. 10 years of pioneering X-ray science at the Free-Electron Laser Flash at Desy. Physics Reports 2019, 808, 1-74.
Serrat, C; Seres, J.; Seres, E.; Dinh, T. H.; Hasegawa, N.; Nishikino, M.; Namba, S. Parametric attosecond pulse amplification far from the ionization threshold from high order harmonic generation in He+. Opt. Express 2020, 28, 24243-24252.
Tanaka, S; Mukamel, S. Coherent X-ray raman spectroscopy: a nonlinear local probe for electronic excitations. Phys. Rev. Lett. 2002, 89, 043001.
Bressler, C.; Chergui, M. Ultrafast Xray absorption spectroscopy. Chem. Rev. 2004, 104, 1781.
Stohr, J.; Scherz, A. Creation of Xray transparency of matter by stimulated elastic forward scattering. Phys. Rev. Lett. 2015, 115, 107402.
Prince, K.; et al. Coherent control with a short-wavelength free-electron laser. Nature Photon. 2016, 10, 176-179.
Norman, P.; Dreuw, A. Simulating Xray spectroscopies and calculating core-excited states of molecules. Chem. Rev. 2018, 118, 7208.
Chen, M.; Lopata, F. First-principles simulations of X-ray transient absorption for probing attosecond electron dynamics. J. Chem. Theory Comput. 2020, 16, 4470.
Zhang Y.; Hua W.; Bennett K.; Mukamel S. Nonlinear Spectroscopy of Core and Valence Excitations Using Short X-Ray Pulses: Simulation Challenges. Top Curr Chem. 2016, 368: 273-345.
Serrat, C. Localized Core Four-Wave Mixing Buildup in the X-ray Spectrum of Chemical Species. J. Phys. Chem. Lett. 2021, 12, 1093-1097.
Bencivenga, F. et al. Four-wave mixing experiments with extreme ultraviolet transient gratings. Nature 2015, 520, 205.
Rouxel, J. R. et al. Hard X-ray transient grating spectroscopy on bismuth germanate. Nat. Photonics 2021.
Shwartz, E.; Shwartz, S. Difference frequency generation of optical radiation from two-color x-ray pulses. Opt. Express 2015, 23, 7471.
Minerbi, E.; Shwartz, S. Difference frequency generation of ultraviolet from x-ray pulses in opaque materials. J. Opt. Soc. Am. B 2019 36, 624.
Apra, E. et al. NWChem: Past, present, and future. J. Chem. Phys. 2020, 152, 184102.
Lopata, K.; Van Kuiken, B. E.; Khalil, M.; Govind, N. Linear-Response and Real-Time Time-Dependent Density Functional Theory Studies of Core-Level Near-Edge X-Ray Absorption. J. Chem. Theory Com put. 2012, 8, 3284-3292.
Wilson, K. R.; Rude, B. S.; Catalano, T.; Schaller, R. D.; Tobin, J. G.; Co, D. T.; Saykally, R. J. X-ray Spectroscopy of Liquid Water Microjets J. Phys. Chem. B 2001, 105, 3346-3349.
Mukamel, S. Principles of Nonlinear Optical Spectroscopy. Oxford University Press, Oxford, 1995. https://global.oup.com/academic/product/principles-of-nonlinear-optical-spectroscopy-9780195132915?cc=US&lang=en&.
Marcus G. et al: "Free-Electron Laser Design for Four-Wave Mixing Experiments with Soft-X-Ray Pulses", Physical Review Letters vol. 113, Mar. 24, 2014 (Mar. 24, 2014), p. 1, left-hand column, paragraph 1.
Drescher M. et al: "X-ray Pulses Approaching the Attosecond Frontier", Science (www.sciencemag.org), vol. 291, No. 5510, Mar. 9, 2001 (Mar. 9, 2001), the whole document.
You Jhih-An et al: "Attosecond photoionization dynamics with stimulated core-valence transitions", Physical Review A, vol. 93, No. 3, Mar. 2016 (Mar. 2016), the whole document.

\* cited by examiner

METHOD AND APPARATUS FOR SELECTIVELY CANCELLING THE EFFECT OF THE ACTIVE CENTER OF A MOLECULE

TECHNICAL FIELD

The present invention provides a method and an apparatus for selectively cancelling the effect of the active center of a target molecule, and also of identical surrounding molecules, through selectively exciting atomic core states of the target molecule.

In this document, by active center it is considered a functional unit of atoms within a (bio) molecule essential for its biochemical function.

BACKGROUND OF THE INVENTION

Selective photodissociation of molecules by resonant excitation near a chosen core ionization edge by means of nonlinear interactions in the X-ray range is becoming conceivable due to recent advances in the development of intense ultrashort X-ray coherent pulse sources, such as synchrotron, free-electron lasers (FEL) and in high-harmonic generation [1-10]. Resonant excitation near a core atomic ionization edge in a molecule follows a rapid redistribution of charge beginning in less than a femtosecond via Auger processes, so that multiple charged molecular ions are formed, and the molecule generally becomes unstable and dissociates.

Several nonlinear interactions in the X-ray range are accordingly being investigated [11]. In a previous work of the inventor of present invention, it was showed how the phase-sensitivity cancellation of the anti-Stokes component previously described in two and three-level systems in the infrared and optical regions can be extended to the X-ray absorption near edge structure (XANES) and extended X-ray absorption fine structure (EXAFS) [6] of chemical species by highly localized four-wave mixing (FWM) nonlinear processes. Femtosecond transient FWM grating spectroscopy with ultrafast X-rays has recently been demonstrated [13,14] showing experimentally how the large penetration depth of X-rays allows probing the bulk properties of materials, addressing core excited states, and creating excitation gratings with unprecedented nanoscale spatial resolution. Among the X-ray wave-mixing processes, difference-frequency generation (DFG) of optical and UV radiation using two-color X-ray laser pulses has been studied theoretically [15, 16].

Scientific document [5] discloses that by tuning the difference of two x-ray frequencies across the valence excitations, it is possible to probe the entire manifold of molecular electronic excitations. The article particularly shows that the wave vector and frequency profiles of this x-ray analogue of coherent Raman spectroscopy provide an excellent real-space probe that carries most valuable structural and dynamical information, not available from spontaneous Raman techniques.

Nevertheless, the CXRS effect explained in [5] is different to the resonantly enhanced frequency-difference generation (re-DFG) effect used in present invention. Indeed, re-DFG is a second order parametric process (elastic scattering), which means that the frequency-difference signal is generated and enhanced by the presence of the target core resonance. CXRS, instead, is a third order non-parametric process (inelastic scattering), in which the frequency-difference signal is not generated at all. In that perspective, the signal that is generated by re-DFG will also directly core excite surrounding identical molecules in the interaction volume, while CXRS will not. Second order nonlinear processes such as re-DFG need much less peak pulse intensities to be produced, while third order processes as CXRS need much higher peak intensities to occur. Second order nonlinear process used in present invention have therefore a much higher cross section than the processes indicated in [5] (third order).

DESCRIPTION OF THE INVENTION

An object of the present invention is to provide a technology for selectively cancelling the effect of the active center of a molecule in pathogens such as, for instance, viruses, bacteria or cancer cells through a resonantly-enhanced difference-frequency generation (re-DFG) effect in the core electrons of an atom of the molecule.

This object is fulfilled by the a method with the features of claim 1 and by an apparatus with the characteristics of claim 12.

Embodiments of the present invention provides, according to one aspect, a method for selectively cancelling the effect of the active center of a molecule, an also of identical surrounding molecules, that comprises: illuminating a target molecule with two synchronized ultrashort intense X-ray pulses using a laser, the two synchronized ultrashort intense X-ray pulses having different central photon energies (i.e. two-color) the subtraction of which matches the photon energy of a peak of the core spectrum of the target molecule, such that a core state of an atom of the target molecule, and also of identical surrounding molecules, is selectively excited by the re-DFG effect as a result of the illumination.

In an embodiment, the method further comprises optimizing the re-DFG effect by a computer system determining optimal pulse parameters of the two synchronized ultrashort X-ray pulses, the pulse parameters comprising the central photon energies, peak intensities and durations of the two synchronized ultrashort X-ray pulses.

In an embodiment, the two pulses are linearly polarized in the x, y and z directions, with all polarizations in phase with each other.

In an embodiment, the two pulses have different durations. In another embodiment, the two pulses have different intensities. In yet another embodiment, the two pulses have both different durations and intensities. In a particular embodiment, the two pulses have a peak intensity of about $10^{12}$ W/cm$^2$.

In an embodiment, each one of the two pulses has a duration comprised in the femtoseconds and/or picoseconds range.

In an embodiment, the method further comprises illuminating the target molecule with two (or more) additional synchronized ultrashort X-ray pulses using the laser, the additional synchronized ultrashort X-ray pulses having different central photon energies the subtraction of which matches the photon energy of another, different, peak of the core spectrum of the target molecule.

In an embodiment, the pulses are collinearly aligned to illuminate the molecule.

Present invention also proposes, according to another aspect, an apparatus for selectively cancelling the effect of the active center of a molecule, and also of identical surrounding molecules. The apparatus includes a laser for directing two synchronized ultrashort X-ray pulses to a target molecule, the two synchronized ultrashort X-ray pulses having different central photon energies the subtraction of which matches the photon energy of a peak of the core spectrum of the molecule, such that a core state of an atom of the molecule, and also of identical surrounding molecules, is selectively excited by the re-DFG effect as a result of said illumination.

According to the invention, the laser can comprise a soft X-ray free-electron laser (FEL) or a highly penetrating hard X-ray FEL.

The molecule can be a biomolecule, such as metalloproteins, a water molecule, or any other molecule in gas, liquid or solid phase.

Present invention can use real-time time-dependent density functional theory simulations to numerically demonstrate that resonantly-enhanced difference frequency generation (re-DFG) involving intense ultrashort coherent x-ray pulses can selectively excite core states of atoms in molecules. Likewise, as a result of the above-described method, the core states of atoms of identical surrounding molecules can be also selectively excited.

Therefore, the technological solution provided by the present invention shows how the illumination of a molecule (e.g. a water molecule) with two-color femtosecond or picosecond highly penetrating X-ray pulses produces a difference-frequency component that is enhanced at an atomic core resonance. The highly selective core excitation by re-DFG X-ray nonlinear processes using said X-ray pulses, as explained before, is equally achievable in more complex molecular systems and bulk materials, with extensive applications, in particular in medicine.

BRIEF DESCRIPTION OF THE DRAWINGS

The previous and other advantages and features will be more fully understood from the following detailed description of embodiments, with reference to the attached figures, which must be considered in an illustrative and non-limiting manner, in which:

FIG. 4: Snapshots of the density-difference 46 as after the exciting two-color field is over, in the case of resonance ($3\omega_0$, $4\omega_0$). The period of the calculated oxygen K-edge is 7.6 as. The illustration shows a complete cycle of the core oxygen excitation, the temporal resolution of the numerical integration is 0.48 as.

DETAILED DESCRIPTION OF THE INVENTION

Present invention provides an apparatus and a method for selectively cancelling the effect of the active center of a (target) molecule, and also of identical surrounding molecules. The target molecule can be in gas, liquid or solid phase. In some particular embodiments, the target molecule is a single gas-phase water molecule, not limitative as the results that will be shown in the following can be extended to other and also larger molecules, such as biomolecules.

The invention involves irradiating the target molecule with two synchronized ultrashort (i.e. femtosecond or picosecond) X-ray pulses of different central photon energies (i.e. two-color) using a laser. The subtraction of the pulses matches the photon energy of a peak of the core spectrum of the target molecule (or target atomic core resonance $\omega_0$, i.e., a resonance corresponding to an absorption ionization edge of wavelength, such that the energy of an absorbed photon is that of the ionization potential of an atomic K or L shell electron of the atom). Consequently, a core state of the target molecule, and also of identical surrounding molecules, is selectively excited by the re-DFG effect.

In a particular embodiment, $\omega_0$ is the oxygen K-edge in the water molecule.

The two-color ultrashort X-ray pulses can have different durations and/or intensities. The duration of the two-color pulses determine the spectral selectivity that can be achieved by the nonlinear re-DFG effect.

Figure 1:
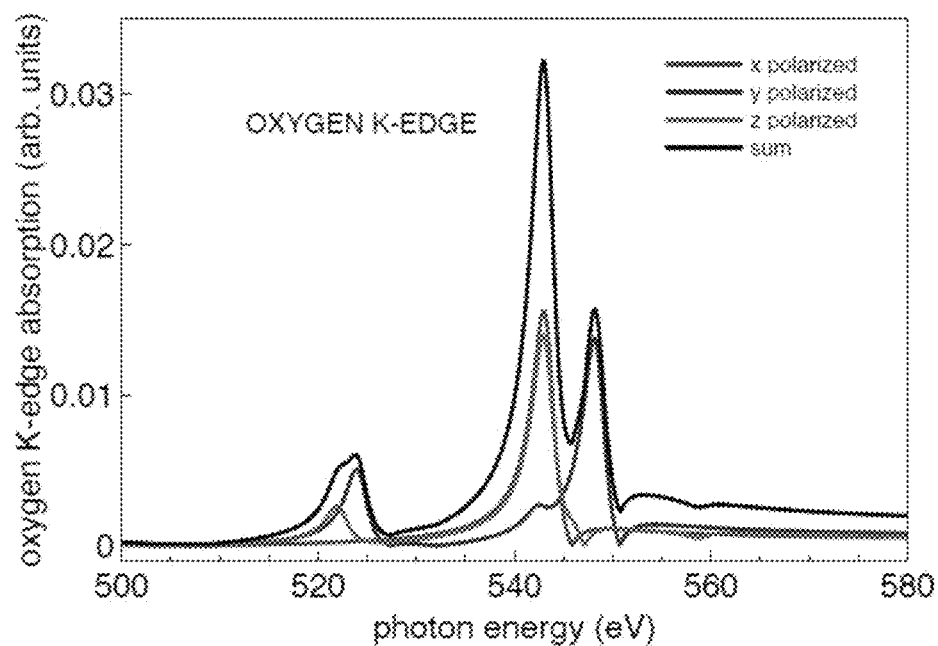
FIG. 1: Oxygen K-edge linear absorption lines obtained from the imaginary part of the Fourier transform of the time-dependent dipole moments, after the molecule has been excited with a small electric field kick of $10^{-4}$ a.u.≈51 mV/nm. The peaks have been broadened to account for core relaxation effects by damping the dipole time signal by $e^{-t/td}$, with td=20 a.u.≈480 as. The absorption obtained with different linear field polarizations together with the sum in the three directions is shown.

To numerically show the above, in a first step, the absorption spectrum of the target molecule around the target absorption edge was calculated. FIG. 1 shows the computed water linear spectrum considering different field polarizations, together with the absorption spectrum obtained by adding the different polarization contributions. In this case, the simulations were performed using the NWChem real-time TDDFT module [17]. Core absorption spectra are calculated using the spectroscopic real-time approach, by exciting the system with a delta-function electric field perturbation [18]. In the present calculations the Gaussian basis set aug-cc-pVTZ were considered for the nuclear geometry optimization in the y-z plane together with the exchange-correlation functional PBE0, and the 6-31G basis set with PBE0 for the real-time TDDFT.

The calculated oxygen K-edge main absorption peak was at 543 eV, which differed by 7 eV from an experimental value.

In a particular embodiment, the two-color laser pulses were linearly polarized in the x, y and z directions, with all polarizations in phase with each other, so that the resulting polarization is not aligned with any of the molecular axis. The two-color field components in each direction can have the form:

$$E(t) = E_0 \cos^2\big((\pi/2\tau)*(t-t_0)\big)\{\cos(3\omega(t-t_0)) + \cos(4\omega(t-t_0))\} \quad (1)$$

where $E_0$ is the peak amplitude of the two-color pulse components, t gives the duration of the pulse, $3\omega$ and $4\omega$ are the respective central angular frequencies and to centers the pulses in the temporal grid.

Figure 2:
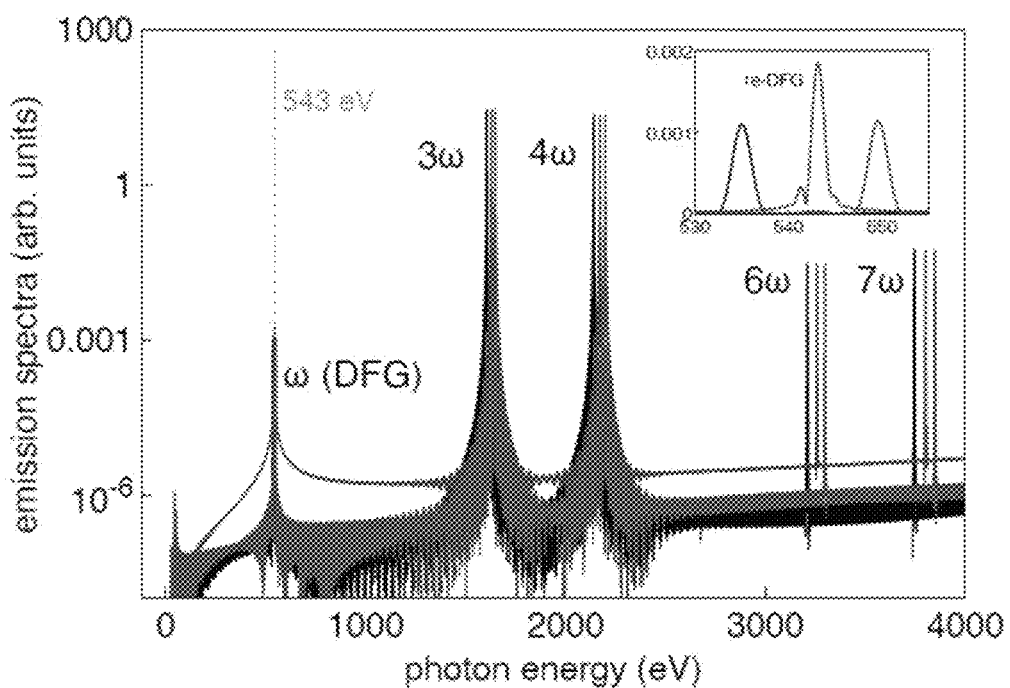
FIG. 2: Spectral signal obtained by Fourier transform of the acceleration of the time dependent dipole resulting from the interaction of the two-color pulses with the water molecule, for three different values of $\omega$. The inset is a zoom of the spectra near the oxygen K-edge showing the enhancement of the DFG signal at resonance ($\omega=\omega_0=543$ eV).
Figure 3:
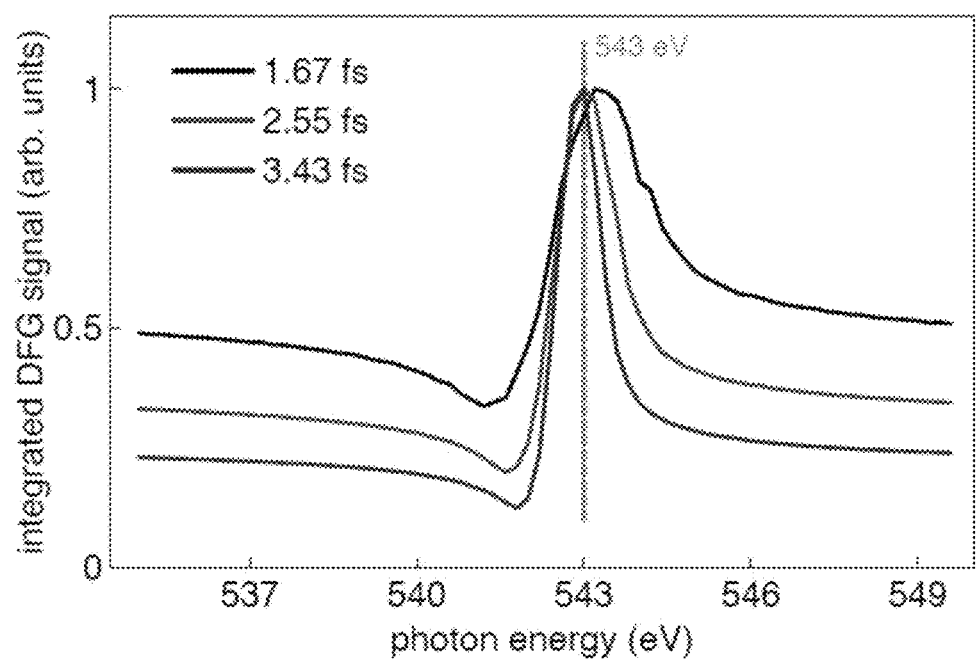
FIG. 3: Integrated DFG spectral signal around the oxygen K-edge (500-600 eV) as a function of the incident photon energy of the two-color pulses.

FIG. 2 shows the spectral signal obtained for three different central photon energy values of the incident two-color pulses that produce a DFG component very close to the calculated oxygen K-edge. The inset shows how the signal peaks exactly at the oxygen K-edge, which is the demonstration that the emitted DFG signal is enhanced by the core oxygen K-edge resonance ($\hbar\omega=\hbar\omega_0=543$ eV). Other frequency mixing effects can also be seen at larger spectral values, which is limited by the calculated spectral range, corresponding to the second harmonic of the $3\omega$ field ($6\omega$) and the sum-frequency generation $3\omega+4\omega$ signal ($7\omega$). The central photon energy of the input two-color pulses ($3\omega$, $4\omega$) has been scanned by varying w to give DGF signals from about 535 eV to 550 eV, and the resulting spectrally integrated DFG signal is plotted in FIG. 3 for three different durations of the two-color input pulses, as indicated. The peak of the integrated DFG signal at the oxygen Kedge (543 eV) can be clearly seen, which is narrower as the duration of the incident pulses is increased. The integrated DFG values in FIG. 3 have been normalized for clarity. It is worth noting that the durations of the pulses considered in the simulations are remarkably short (1.67 fs, 2.56 fs, and 3.43 fs), and therefore much narrower peaks in FIG. 3 can be expected by considering longer incident pulses, which would result in a more selective re-DFG effect.

After the two-color laser pulses interact with the water molecule, the system remains core excited due to re-DFG when $\omega=\omega_0=543$ eV, since no relaxation processes are considered in the simulations. The difference between the excited and ground state charge densities (density-difference) follow complicated dynamics around the oxygen atom, with a periodicity that corresponds to the oxygen K-edge absorption photon energy.

Figure 4:
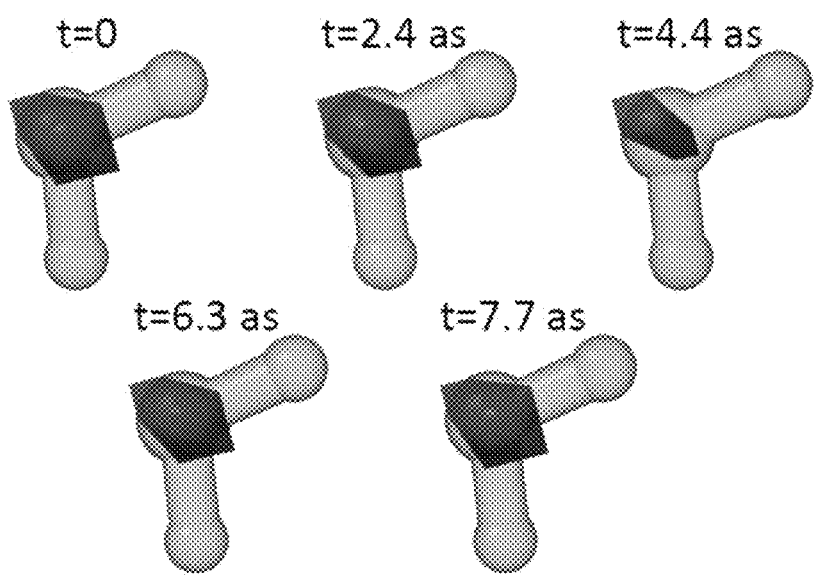

This is illustrated in FIG. 4, where some snapshots of the density-difference were evaluated after the exciting two-color pulses are over and for a duration corresponding to the oxygen K-edge period (7.6 as). The density-difference dynamics clearly shows how the core states of the oxygen atom have been excited by the nonlinear re-DFG effect.

Figure 5:
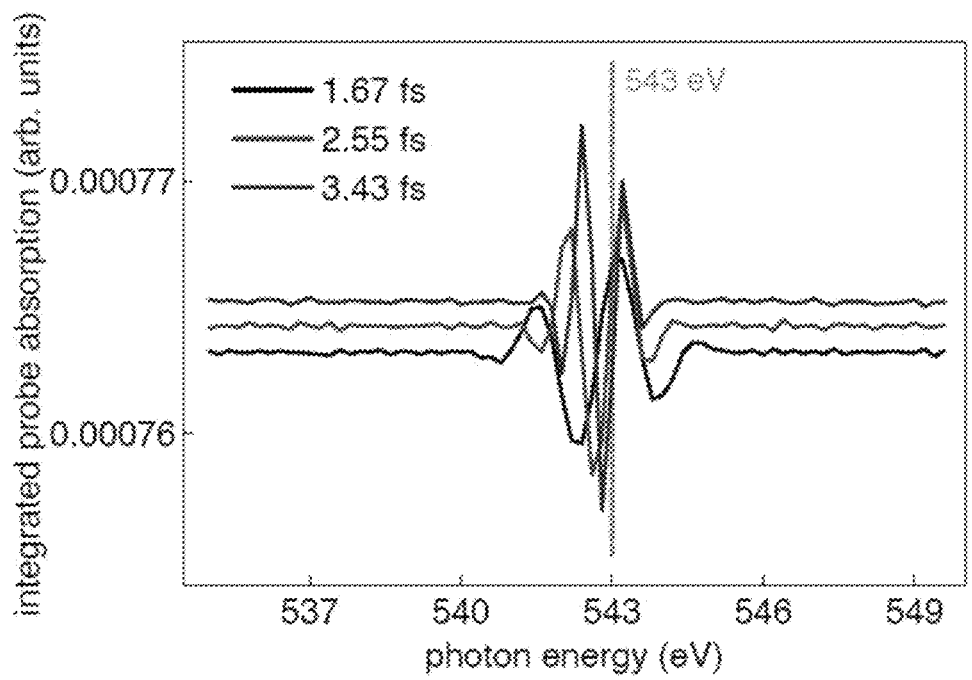
FIG. 5: Integrated absorption spectrum of the probe pulse around the oxygen K-edge (500-600 eV) as a function of the incident photon energy ($\hbar\omega$) of the two-color pulses.

To also evaluate the invention in an all-laser-field approach, the degree of excitation of the oxygen after the interaction with the two-color pulses was computed by a $\cos^2$ envelope probe pulse of 0.8 fs (FWHM) duration and $10^4$ W/cm$^2$ peak intensity, with the central photon energy of the calculated oxygen K-edge ($\omega=543$ eV). The probe was delayed 240 as from the end of the input two-color pulses. The absorption of the weak probe pulse following the nonlinear excitation of the system is given by the imaginary part of the Fourier transform of the resulting time-dependent dipole moment time-windowed in the region of the probe pulse [20]. The integrated absorption spectrum as a function of the central photon energy of the input two-color pulses, i.e. as a function of $\hbar\omega$, is shown in FIG. 5. Clear oscillations of the absorption rate around the oxygen K-edge can be observed, which provide the evidence that the atom is excited about 543 eV, as it has already been illustrated in FIG. 3. Also clear in FIG. 5 is the spectral width of the excitation, which is established by the duration of the input pulses, as commented above. The period of the oscillations in the integrated absorption spectrum corresponds to the Fourier limited bandwidth of the input pulses, which is roughly 1.6 eV for the 1.67 fs pulses, 1.1 eV for the 2.55 fs, and 0.8 eV for the 3.43 fs, as the result of the periodic convolution between the probe field and the nonlinearly DFG generated time-dependent dipole moment, which modulates their time-delay and therefore also the probe absorption rate [20].

Figure 6:
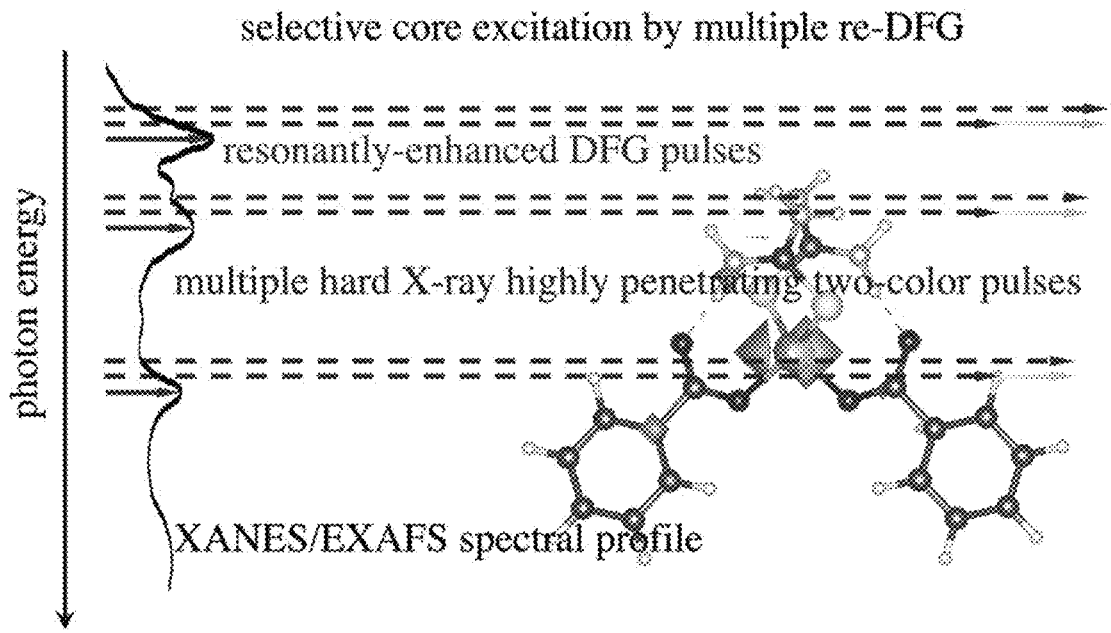
FIG. 6: Illustration of selective core excitation of an atom in a biomolecule by multiple hard X-ray re-DFG tuned at three different spectral peaks of the XANES/EXAFS spectral profile of the molecule. The XANES/EXAFS absorption profile provides a fingerprint of the state of a specific molecule. The essential in this hard X-ray approach is that the two-color hard X-ray pulses can be highly penetrating in bulk, while the core resonant re-DFG signals are not.

With reference now to FIG. 6, therein another embodiment of the present invention is shown. In this case, the selectivity of the outlined re-DFG process is further optimized using a combination of several synchronized ultrashort two-color X-ray pulses of different photon energies, which can produce re-DFG signals resonant with several XANES/EXAFS absorption lines simultaneously, resulting in additional selective local excitation of the target molecule.

Figure 7:
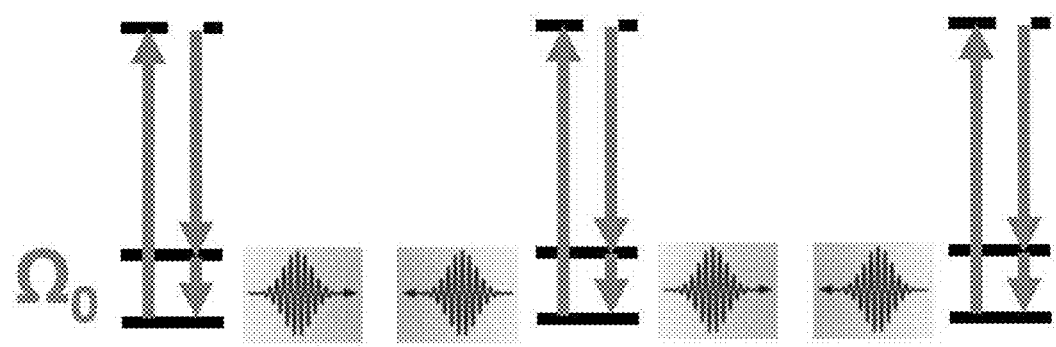
FIG. 7: Illustration of direct core local excitation in the interaction volume by the coherent re-DFG signal absorbed in neighboring identical molecules.

Additionally, FIG. 7 illustrates how the re-DFG generated coherent signal will be directly absorbed by the core resonances in surrounding identical molecules of the target interaction volume.

Beyond the fundamental and applied interest of the nonlinear re-DFG X-ray matter interaction process presented in a single gas-phase water molecule, the invention can be extended to higher photon energies following the rapid advances in FEL sources, such as considering two-color hard X-rays to core excite higher atomic number atoms by re-DFG. The essential in this hard X-ray approach is that the two-color pulses can be highly penetrating in bulk, while the core resonant re-DFG signals are not. Therefore, by virtue of the results from the water model that have been detailed, the same can be achieved in the atomic edges of, for example, biomolecular zinc complexes.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

The scope of the present invention is defined in the following set of claims.

REFERENCES

[1] Schoenlein, R. W.; Chattopadhyay, S.; W. Chong, H. H.; Glover, T. E.; Heimann, P. A.; Shank, C. V.; Zholents, A. A.; Zolotorev, M. S. Generation of femtosecond pulses of synchrotron radiation. Science 2000, 287, 223.

[2] Feng, C.; Deng, H. Review of fully coherent free-electron lasers. Nucl. Sci. Tech. 2018, 29, 160.

[3] Rossbach, J; Schneider, J. R.; Wurth, W. 10 years of pioneering X-ray science at the Free-Electron Laser FLASH at DESY. Physics Reports 2019, 808, 1-74.

[4] Serrat, C; Seres, J.; Seres, E.; Dinh, T. H.; Hasegawa, N.; Nishikino, M.; Namba, S. Parametric attosecond pulse amplification far from the ionization threshold from high order harmonic generation in He+. Opt. Express 2020, 28, 24243-24252.

[5] Tanaka, S; Mukamel, S. Coherent X-ray raman spectroscopy: a nonlinear local probe for electronic excitations. Phys. Rev. Lett. 2002, 89, 043001.

[6] Bressler, C.; Chergui, M. Ultrafast Xray absorption spectroscopy. Chem. Rev. 2004, 104, 1781.

[7] Stohr, J.; Scherz, A. Creation of Xray transparency of matter by stimulated elastic forward scattering. Phys. Rev. Lett. 2015, 115, 107402.

[8] Prince, K.; et al. Coherent control with a short-wavelength free-electron laser. Nature Photon. 2016, 10, 176-179.

[9] Norman, P.; Dreuw, A. Simulating Xray spectroscopies and calculating core-excited states of molecules. Chem. Rev. 2018, 118, 7208.
[10] Chen, M.; Lopata, F. First-principles simulations of X-ray transient absorption for probing attosecond electron dynamics. J. Chem. Theory Comput. 2020, 16, 4470.
[11] Zhang Y.; Hua W.; Bennett K.; Mukamel S. Nonlinear Spectroscopy of Core and Valence Excitations Using Short X-Ray Pulses: Simulation Challenges. Top Curr Chem. 2016, 368:273-345.
[12] Serrat, C. Localized Core Four-Wave Mixing Buildup in the X-ray Spectrum of Chemical Species. J. Phys. Chem. Lett. 2021, 12, 1093-1097.
[13] Bencivenga, F. et al. Four-wave mixing experiments with extreme ultraviolet transient gratings. Nature 2015, 520, 205.
[14] Rouxel, J. R. et al. Hard X-ray transient grating spectroscopy on bismuth germanate. Nat. Photonics 2021.
[15] Shwartz, E.; Shwartz, S. Difference frequency generation of optical radiation from two-color x-ray pulses. Opt. Express 2015, 23, 7471.
[16] Minerbi, E.; Shwartz, S. Difference frequency generation of ultraviolet from x-ray pulses in opaque materials. J. Opt. Soc. Am. B 2019 36, 624.
[17] Aprà, E. et al. NWChem: Past, present, and future. J. Chem. Phys. 2020, 152, 184102.
[18] Lopata, K.; Van Kuiken, B. E.; Khalil, M.; Govind, N. Linear-Response and Real-Time Time-Dependent Density Functional Theory Studies of Core-Level Near-Edge X?Ray Absorption. J. Chem. Theory Comput. 2012, 8, 3284?3292.
[19] Wilson, K. R.; Rude, B. S.; Catalano, T.; Schaller, R. D.; Tobin, J. G.; Co, D. T.; Saykally, R. J. X-ray Spectroscopy of Liquid Water Microjets J. Phys. Chem. B 2001, 105, 3346-3349.
[20] Mukamel, S. Principles of Nonlinear Optical Spectroscopy. Oxford University Press, Oxford, 1995.

What is claimed is:

1. A method for selectively cancelling the effect of the active center of a molecule, the method comprising illuminating a target molecule with two synchronized ultrashort X-ray pulses using a laser, the two synchronized ultrashort X-ray pulses having different central photon energies a subtraction of which matches a photon energy of a peak of a core spectrum of the target molecule, such that a core state of an atom of the target molecule, and also of identical surrounding molecules, is selectively excited by a re-DFG effect as a result of the illumination.

2. The method of claim 1, further comprising optimizing the re-DFG effect by a computer system determining optimal pulse parameters of the two synchronized ultrashort X-ray pulses, the pulse parameters comprising central photon energies, peak intensities and durations of the two synchronized ultrashort X-ray pulses.

3. The method of claim 1, wherein the two synchronized ultrashort X-ray pulses are linearly polarized in the x, y and z directions, with all polarizations in phase with each other.

4. The method of claim 1, wherein the two synchronized ultrashort X-ray pulses have different durations and/or intensities.

5. The method of claim 1, wherein each one of the two synchronized ultrashort X-ray pulses has a duration in the femtoseconds and/or picoseconds range.

6. The method of claim 1, further comprising illuminating the target molecule with at least two additional synchronized ultrashort X-ray pulses, the at least two additional synchronized ultrashort X-ray pulses having different central photon energies a subtraction of which matches a photon energy of another peak of the core spectrum of the target molecule.

7. The method of claim 1, wherein the laser comprises a soft X-ray free-electron laser or a highly penetrating hard X-ray free-electron laser.

8. The method of claim 1, wherein the target molecule is in gas, liquid or solid phase.

9. The method of claim 1, wherein the target molecule is a biological molecule.

10. The method of claim 1, wherein the target molecule is water.

11. The method of claim 1, wherein the synchronized ultrashort X-ray pulses are illuminated collinearly to the target molecule.

12. An apparatus for selectively cancelling the effect of the active center of a molecule, comprising:
a laser configured to direct two synchronized ultrashort X-ray pulses to a target molecule, the two synchronized ultrashort X-ray pulses having different central photon energies a subtraction of which matches a photon energy of a peak of a core spectrum of the target molecule, such that a core state of an atom of the target molecule, and also of identical surrounding molecules, is selectively excited by a re-DFG effect as a result of said illumination.

13. The apparatus of claim 12, further comprising a computing system configured to determine optimal pulse parameters of the two synchronized ultrashort X-ray pulses in order to optimize the re-DFG effect, the pulse parameters comprising central photon energies, peak intensities and durations.

14. The apparatus of claim 12, wherein the laser comprises a soft X-ray free-electron laser or a highly penetrating hard X-ray free-electron laser.

15. The apparatus of claim 12, wherein the target molecule is in gas, liquid or solid phase.

16. The apparatus of claim 12, wherein the target molecule comprises a biological molecule.

* * * * *